United States Patent
Abrams

(10) Patent No.: US 9,849,652 B2
(45) Date of Patent: *Dec. 26, 2017

(54) FLEXIBLE HEAT SEALABLE DECORATIVE ARTICLES AND METHOD FOR MAKING THE SAME

(71) Applicant: Louis Brown Abrams, Ft. Collins, CO (US)

(72) Inventor: Louis Brown Abrams, Ft. Collins, CO (US)

(73) Assignee: HIGH VOLTAGE GRAPHICS, INC., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,691

(22) Filed: Nov. 23, 2015

(65) Prior Publication Data

US 2016/0101601 A1    Apr. 14, 2016

Related U.S. Application Data

(63) Continuation of application No. 14/053,399, filed on Oct. 14, 2013, now Pat. No. 9,193,214.

(Continued)

(51) Int. Cl.
   *B32B 3/00* (2006.01)
   *B32B 15/095* (2006.01)
   (Continued)

(52) U.S. Cl.
   CPC .......... *B32B 15/095* (2013.01); *B23K 26/362* (2013.01); *B23K 26/402* (2013.01); *B29C 59/16* (2013.01); *B32B 7/12* (2013.01); *B32B 15/08* (2013.01); *B32B 27/08* (2013.01); *B32B 27/40* (2013.01); *B44C 1/228* (2013.01);
   (Continued)

(58) Field of Classification Search
   CPC ....... B32B 15/095; B32B 7/12; B23K 26/362; Y10T 428/24802
   See application file for complete search history.

(56) References Cited

U.S. PATENT DOCUMENTS 1,583,274 A    5/1926    Bostock
2,011,058 A    8/1935    Krase et al.
(Continued)

FOREIGN PATENT DOCUMENTS

EP    1087054    3/2001
FR    2442721    8/1980
(Continued)

OTHER PUBLICATIONS

Reilly, "Celluloid Objects: Their Chemistry and Preservation," J. Am. Inst. Conservation, 1991, vol. 30(2), (pp. 145-162), 3 pages.

(Continued)

*Primary Examiner* — Elizabeth Mulvaney
(74) *Attorney, Agent, or Firm* — Sheridan Ross P.C.

(57) ABSTRACT

Various flexible heat sealable decorative articles and methods of making the same are described. The flexible heat sealable decorative articles are lightweight and can be combined with other decorative elements, such as metalized films. Various decorative are mixed or combined with one another to form highly attractive flexible heat sealable decorative articles.

24 Claims, 9 Drawing Sheets

Related U.S. Application Data

(60) Provisional application No. 61/813,945, filed on Apr. 19, 2013, provisional application No. 61/760,490, filed on Feb. 4, 2013, provisional application No. 61/758,607, filed on Jan. 30, 2013, provisional application No. 61/754,410, filed on Jan. 18, 2013, provisional application No. 61/718,329, filed on Oct. 25, 2012, provisional application No. 61/714,586, filed on Oct. 16, 2012, provisional application No. 61/713,210, filed on Oct. 12, 2012.

(51) Int. Cl.

| | | |
|---|---|---|
| *B44F 1/04* | (2006.01) | |
| *C09J 7/02* | (2006.01) | |
| *B29C 59/16* | (2006.01) | |
| *B44C 1/22* | (2006.01) | |
| *B23K 26/362* | (2014.01) | |
| *B23K 26/402* | (2014.01) | |
| *B32B 7/12* | (2006.01) | |
| *B32B 27/08* | (2006.01) | |
| *B32B 27/40* | (2006.01) | |
| *B32B 15/08* | (2006.01) | |

(52) U.S. Cl.
CPC .......... *B44F 1/045* (2013.01); *C09J 7/0203* (2013.01); *C09J 7/0282* (2013.01); *C09J 7/0296* (2013.01); *B32B 2255/10* (2013.01); *B32B 2255/205* (2013.01); *B32B 2307/4026* (2013.01); *B32B 2307/51* (2013.01); *B32B 2307/54* (2013.01); *B32B 2307/72* (2013.01); *B32B 2307/75* (2013.01); *B32B 2437/00* (2013.01); *B32B 2451/00* (2013.01); *C09J 2201/20* (2013.01); *C09J 2475/00* (2013.01); *C09J 2475/006* (2013.01); *Y10T 428/24843* (2015.01)

(56) References Cited

U.S. PATENT DOCUMENTS

| | | |
|---|---|---|
| 3,152,950 A | 10/1964 | Palmquist |
| 3,550,945 A | 12/1970 | Resnick |
| 3,565,742 A | 2/1971 | Stephens et al. |
| 3,660,200 A | 5/1972 | Anderson et al. |
| 3,674,611 A | 7/1972 | Petry et al. |
| 3,979,538 A | 9/1976 | Gilman et al. |
| 4,031,281 A | 6/1977 | Keeling |
| 4,062,992 A | 12/1977 | Power et al. |
| 4,101,698 A | 7/1978 | Dunning et al. |
| 4,126,500 A | 11/1978 | Palanos |
| 4,287,629 A | 9/1981 | Stalteri |
| 4,308,296 A | 12/1981 | Chitouras |
| 4,318,946 A | 3/1982 | Pavone |
| 4,390,387 A | 6/1983 | Mahn |
| 4,418,106 A | 11/1983 | Landler et al. |
| 4,446,274 A | 5/1984 | Okazaki et al. |
| 4,451,721 A | 5/1984 | Nemeskeri |
| 4,510,274 A | 4/1985 | Okazaki et al. |
| 4,610,904 A | 9/1986 | Mahn, Sr. et al. |
| 4,652,478 A | 3/1987 | Maii |
| 4,657,807 A | 4/1987 | Fuerstman |
| 4,670,089 A | 6/1987 | Hanson |
| 4,687,527 A | 8/1987 | Higashiguchi |
| 4,741,791 A | 5/1988 | Howard et al. |
| 4,810,549 A | 3/1989 | Abrams et al. |
| 4,828,918 A | 5/1989 | Miquel |
| 5,047,103 A | 9/1991 | Abrams et al. |
| 5,143,672 A | 9/1992 | Kuwahara |
| 5,338,603 A | 8/1994 | Mahn et al. |
| 5,346,746 A | 9/1994 | Abrams |
| 5,359,790 A | 11/1994 | Iverson et al. |
| 5,383,996 A | 1/1995 | Dressler |
| 5,480,506 A | 1/1996 | Mahn, Sr. et al. |
| 5,520,988 A | 5/1996 | Kuwahara |
| 5,529,650 A | 6/1996 | Bowers et al. |
| 5,564,249 A | 10/1996 | Borys et al. |
| 5,589,022 A | 12/1996 | Kuwahara |
| 5,597,637 A | 1/1997 | Abrams et al. |
| 5,599,416 A | 2/1997 | Kuwahara |
| 5,677,037 A | 10/1997 | Kuwahara |
| 5,681,420 A | 10/1997 | Yamane |
| 5,766,397 A | 6/1998 | Jones |
| 6,010,764 A | 1/2000 | Abrams |
| 6,083,332 A | 7/2000 | Abrams |
| 6,110,560 A | 8/2000 | Abrams |
| 6,224,707 B1 | 5/2001 | Lion |
| 6,514,624 B2 | 2/2003 | Takemoto |
| 6,875,395 B2 | 4/2005 | Kisha et al. |
| 6,977,023 B2 | 12/2005 | Abrams |
| 7,036,200 B2 | 5/2006 | Fabrige |
| 7,344,769 B1 | 3/2008 | Abrams |
| 7,364,782 B2 | 4/2008 | Abrams |
| 7,381,284 B2 | 6/2008 | Abrams |
| 7,390,552 B2 | 6/2008 | Abrams |
| 7,402,222 B2 | 7/2008 | Abrams |
| 7,632,371 B2 | 12/2009 | Abrams |
| 7,799,164 B2 | 9/2010 | Abrams |
| 7,914,895 B2 | 3/2011 | Reid |
| 8,110,059 B2 | 2/2012 | Kuwahara |
| RE45,802 E | 11/2015 | Abrams |
| 9,175,436 B2 | 11/2015 | Abrams |
| 9,180,728 B2 | 11/2015 | Abrams |
| 9,180,729 B2 | 11/2015 | Abrams |
| 9,193,214 B2 * | 11/2015 | Abrams ............... C09J 7/0282 |
| 2001/0008672 A1 | 7/2001 | Norvell et al. |
| 2003/0114627 A1 | 6/2003 | Holeschovsky et al. |
| 2005/0001419 A1 | 1/2005 | Levy et al. |
| 2005/0070434 A1 | 3/2005 | Drake |
| 2005/0081985 A1 | 4/2005 | Abrams |
| 2007/0204493 A1 | 9/2007 | Foley et al. |
| 2007/0289688 A1 | 12/2007 | Abrams |
| 2008/0302772 A1 | 12/2008 | Lion |
| 2009/0093200 A1 | 4/2009 | Iwase et al. |
| 2009/0149589 A1 | 6/2009 | Thompson et al. |
| 2010/0092719 A1 | 4/2010 | Abrams |
| 2011/0052859 A1 | 3/2011 | Abrams |
| 2013/0078413 A1 | 3/2013 | Abrams |
| 2013/0115408 A1 | 5/2013 | Abrams |
| 2015/0056400 A1 | 2/2015 | Abrams |
| 2015/0129105 A1 | 5/2015 | Abrams |

FOREIGN PATENT DOCUMENTS

| | | |
|---|---|---|
| GB | 1171296 | 11/1969 |
| JP | S61-286120 | 12/1986 |
| JP | H03-069364 | 3/1991 |
| JP | 04-169297 | 6/1992 |
| JP | H05-269929 | 10/1993 |
| JP | 11-277662 | 10/1999 |
| JP | 11-348159 | 12/1999 |
| JP | 2002-067591 | 3/2002 |
| JP | 2003-508260 | 3/2003 |
| JP | 2010-528160 | 8/2010 |
| JP | 2011-509316 | 3/2011 |
| KR | 2003063833 | 7/2003 |
| WO | WO 79/00103 | 3/1979 |

OTHER PUBLICATIONS

International Search Report and Written Opinion for International (PCT) Patent Application No. PCT/US13/64871, dated Feb. 12, 2014, 9 pages.

International Preliminary Report on Patentability for International (PCT) Patent Application No. PCT/US13/64871, dated Jun. 11, 2015, 10 pages.

Official Action for Japanese Patent Application No. 2015-536989, dated Sep. 1, 2015, 3 pages.

Official Action (with English translation) for Japanese Patent Application No. 2015-536989, dated Apr. 28, 2016, 4 pages.

(56) References Cited

OTHER PUBLICATIONS

Official Action for U.S. Appl. No. 14/053,399, dated Feb. 12, 2015, 5 pages.
Notice of Allowance for U.S. Appl. No. 14/053,399, dated Jun. 17, 2015, 5 pages.

* cited by examiner

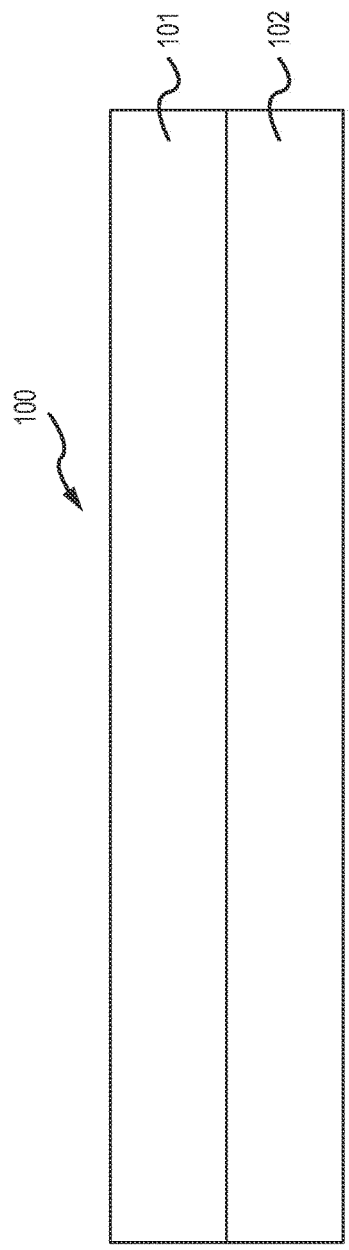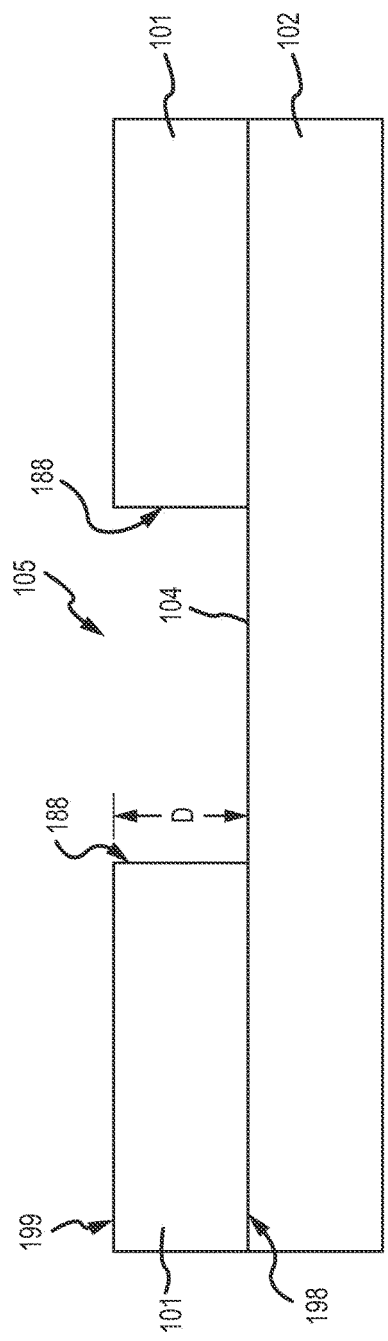

FLEXIBLE HEAT SEALABLE DECORATIVE ARTICLES AND METHOD FOR MAKING THE SAME

CROSS REFERENCE TO RELATED APPLICATION

The present application is a continuation application of U.S. application Ser. No. 14/053,399 with a filing date of Oct. 14, 2013 entitled "FLEXIBLE HEAT SEALABLE DECORATIVE ARTICLES AND METHOD FOR MAKING THE SAME;" which claims the benefit of and priority to U.S. Provisional Application Ser. Nos. 61/813,945 with a filing date of Apr. 19, 2013, 61/760,490 with a filing date Feb. 4, 2013, 61/758,607 with a filing date of Jan. 30, 2013, 61/754,410 with a filing date of Jan. 18, 2013, 61/718,329 with a filing date of Oct. 25, 2012, 61/714,586 with a filing date of Oct. 16, 2012 and 61/713,210 with a filing date of Oct. 12, 2012 all entitled "Decorative Metalized Films", each of which is incorporated herein by this reference in its entirety.

FIELD

This disclosure generally relates to flexible heat sealable decorative articles, the flexible heat sealable decorative articles are lightweight and can be combined with other decorative elements, such as metalized films.

BACKGROUND

For many years people have created decorative articles composed of contrasting materials, special effects, prints, and the like. These decorative articles have included flock, woven or knit textiles, and metalized films. While these articles have, in many cases, been attractive to viewers, they have generally lacked one or more of desired design features of richness of color, luminosity, flexibility, and lightness of weight, which has caused the articles to have low perceived value. In fact, decorative articles have not kept pace with significant advances in textile design and construction and the explosion of special visual effects and higher graphic art standards and requirements realizable in the digital age, which have collectively resulted in higher expectations associated with indicia of perceived value.

There is therefore a need for a new class of decorative articles meeting the more stringent aesthetics and functional requirements of today's society.

SUMMARY

These and other needs are addressed by the various embodiments and configurations of the present disclosure. This disclosure relates generally to flexible heat sealable decorative articles. More specifically, this disclosure relates to lightweight, flexible heat sealable decorative articles and to methods for making the same. Furthermore, these lightweight, flexible heat sealable decorative articles can be combined with other decorative elements, such as metalized films.

The lightweight, flexible heat sealable decorative articles can be adhered to any item of commerce. For example, decorative articles can be permanently adhered to items of apparel. Non-limiting examples of decorative articles include nametags, company logos, team logos, badges, emblems, trade or brand names, appliqués, heat transfers, patches, stickers, and a variety of artistic and graphic design elements. The decorative articles can be formed to have the look and appearance of metals, without the weight and expense of metals. For example, the decorative articles can have the appearance of gold, silver or other precious metals. Moreover, the decorative articles can include multiple decorative elements such as flock, woven textiles, knit textiles, and polymeric coatings and films. These other decorative elements can be configured with the flexible heat sealable decorative article to provide contrasting decorative properties (e.g., surface geometries and textures), light or optical reflectivities (e.g., brightness and/or high or low luster and which is typically a function of yarn optical properties and textile construction), constructions, colors, and/or designs), which can provide not only a visual interplay between the contrasting materials (which, as noted, are decorative elements of a whole or single design or image) but also a greater richness and depth of the design or image (e.g., an appearance of 3-D dimensionality). Stated another way, the use of multiple decorative elements (different types of decorative elements and/or common types of decorative elements having differing decorative properties) can greatly increase the perceived value of a design by creating the depth, contrast, and interplay of the various decorative elements. It can permit or enable a design to be subdivided into logical design or decorative elements, which are emphasized (e.g., emphasis effected by locating decorative element on top or foreground) or subordinated (e.g., subordination effected by locating decorative element on the bottom or background), thereby adding to the article a real or perceived 3-D dimensionality and making logical "design sense" to a viewer.

The formation of the flexible, heat sealable decorative articles by laser etching and/or engraving allows for a high level of customization of the decorative articles by combining digital graphics technology. The use of digital graphics technology substantially eliminates tooling, screens, decrease set-up time. Moreover, the use of digital graphics technology enables custom individual images to be prepared and/or modifying images during manufacturing. Digital graphics can include dimensional graphic design features. Such dimensional graphic features include digital printing of ink directly onto decorative article to form a three-dimensional appearing image, or to form a image that appears to embossed. Such images have a higher perceived value.

Heat sealable decorative articles have a higher perceived value by consumers due to the ability to survive multiple wash cycles. Furthermore, heat sealable articles are valued for their convenience of applicability to substrates.

The decorative articles according to this disclosure combine decorative elements in previously unknown configurations and with previously unattainable flexibility and lightness. Synergistic visual and/or dimensional affects are provided by a complimentary combination of materials and design elements, with the added advantages of being flexible and lightweight.

Some embodiments of this disclosure include a decorative article that can comprise an adhesive layer and a flexible polymeric layer. The adhesive layer can be adhered to the flexible polymeric layer. Typically, the flexible polymeric layer can have one or more voids. The flexible polymeric layer is generally positioned on viewable decorative surface to be visible to a viewer of the decorative article. The decorative surface can be the viewable surfaces of any item of commerce. Non-limiting examples of such viewable decorative surfaces is typically intended to be viewed by a view when the decorative article is being used for its intended purpose, e.g. when the decorative article is adhered to attached to an item of commerce. The surfaces of an item of apparel such the exterior and neck portions of shirts and blouses, the exterior and waist band portions of pants and slacks, and so forth.

The decorative article typically has a density of no more than about 1.5 g/cm$^3$. The decorative article typically has a tensile strength of no more than about $10^7$ Pascals. The tensile strength generally refers to a measure of the ability to withstand pulling stress, and is typically defined as the stress (stretching force per unit area) required to break the article. The decorative article commonly has a modulus of elasticity or flex strength of no more than about $10^9$ Pascals. The modulus of elasticity, flex (as known as flexural) strength, or cross-breaking strength generally refers to a measure of the bending strength or stiffness expressed as the stress required to break the article by exerting a torque on it.

Moreover, some embodiments can include a decorative article that can comprise a flexible polymeric layer and an adhesive layer. The flexible layer can have one or more voids. Generally, an insert is positioned in the one or more voids. The decorative article typically includes the insert positioned in some but not all of the one or more voids. Moreover, the adhesive layer can be visible in the other of one or more voids not having the insert positioned therein.

The decorative article can have an optically transmissive layer positioned between the flexible polymeric layer and the adhesive layer. Typically, the optically transmissive layer comprises a thermoplastic resin film. In some configurations, a color-enhancing layer is positioned between the optically transmissive layer and the adhesive layer. Generally, the color-enhancing layer comprises a translucent color-containing ink layer.

The flexible polymeric layer can comprise a metalized film having a metallic appearance. The flexible polymeric layer can comprise one of polyester or polyurethane. Generally, the flexible polymeric layer comprises polyester. More generally, the flexible polymeric layer comprises polyurethane. Furthermore, the flexible polymeric layer can comprise a sublimation printable polymeric material. Commonly, the flexible polymeric layer can contain a sublimation dye-printed image. The flexible polymeric layer can have a density of no more than about 1.5 g/cm$^3$. Generally, flexible polymeric layer has a tensile strength of no more than about $10^7$ Pascals. The flexible polymeric layer can have a modulus of elasticity or flex strength of no more than about $10^9$ Pascals.

The adhesive layer can have a color. The adhesive layer can comprise one of polyester or polyurethane. Generally, the adhesive layer comprises polyester. More generally, the adhesive layer comprises polyurethane.

The decorative article can further comprise the flexible polymeric layer adhered to an item of apparel by the adhesive layer.

Some embodiments of this disclosure include a method having the steps of providing an decorative article intermediate, registering the decorative article intermediate with a laser etching system, and etching the decorative article intermediate by contacting the decorative article intermediate with a laser beam generated by the laser system. The contacting of the laser beam with the decorative article intermediate generally forms one or more voids in decorative article intermediate.

Commonly the decorative article intermediate can comprise an adhesive layer adhered to a flexible polymeric layer. The one or more voids are typically formed in the flexible polymeric layer by the contacting of the laser beam with the decorative article intermediate. The adhesive layer can be visible within the one or more voids.

The decorative article intermediate can comprise a flexible polymeric layer. The one or more voids are generally formed in the flexible polymeric layer by the laser beam contacting the flexible polymeric layer. Furthermore, after forming one or more voids in the flexible polymeric layer, an adhesive layer can be contacted with the flexible polymeric layer. Generally, after contacting the adhesive layer with the flexible polymeric layer, the adhesive layer can be visible within the one or more voids.

The step of registering can comprise one of a mechanical registration, optical registration, electro-mechanical registration, computerized registration, or combination thereof. Typically, the step of registering comprises one of optical registration, electro-mechanical registration, computerized registration, or combination thereof. More typically, the step of registering is an optical registration. Even more typically, the step of registering is an electro-mechanical registration. Yet even more typically, the step of registering is a computerized registration.

The step of contacting of the laser bean with the decorative article intermediate can comprise a sequential contacting of the laser beam with the decorative intermediate. Generally, the contacting of a laser beam with the decorative article intermediate removes at least some of the decorative article intermediate. More generally, each sequential contacting of the laser beam with the decorative article removes at least some of the decorative article intermediate contained in the one or more voids. Moreover, when the decorative intermediate comprises a flexible polymeric layer adhered to an adhesive layer, the laser etching typically comprises sufficient laser beam energy and sufficient sequential passes of the laser beam to remove at least most, if not all, of the decorative article intermediate contained in the one or more voids but little, if any, of the second layer material.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Adhesive" generally refers to a composition comprising homopolymers, copolymers or polymer alloy comprising one or more of polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a preferred embodiment, the thermoplastic adhesive composition comprises one of acrylonitrile butadiene styrene, acrylic (PMMA), celluloid, cellulose acetate, cyclo-olefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycarbonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphenylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitrile (SAN), and combinations thereof. The adhesive may be one of a thermosetting adhesive, a thermoplastic adhesive, a substantially A-staged thermosetting adhesive, a substantially B-staged thermosetting adhesive, a self-supporting adhesive film, a bi-laminate adhesive film having first and second adhesive layers, the first adhesive layer and second adhesive layer differing in one or both of chemical composition and physical properties, a tri-laminate adhesive film having a polymeric film positioned between a first adhesive film and a second adhesive film, a fast flow, low-melt adhesive, a hot-melt adhesive; and a combination and/or mixture thereof. Further regarding the tri-laminate adhesive film, the first adhesive film and second adhesive film may differ in one or both of chemical composition and physical properties, or have substantially the same chemical composition and physical properties, and the polymeric film may comprise one or more of an elastomeric material, a substantially inelastic material, clear, opaque, colored, uncolored, or a combination thereof. The polymeric film may be a tie layer.

"Cutting" and/or "etching" generally refer to any suitable technique and/or method, to form one or more of the article and any of the decorative elements or articles described herein. The article and any of the one or more of the decorative elements can be cut before, during, and/or after registering. The cutting process may be any suitable cutting device known to a person of ordinary skill within the art, such as a steel-rule dies, hard tool metal dies, laser cutter, ultrasound cutter, high frequency cutter, hot-wire cutter, or water jet cutter. Commonly, the cutting process is one of laser or die cutting process. The cutting and/or etching process may also include ablation. Particularly preferred laser cutting, etching and/or ablation processes are disclosed in U.S. application Ser. No. 11/874,146 to Abrams, which is incorporated in its entirety herein by this reference. Laser cutting and/or etching are preferred in applications where discoloration is not an issue. Laser cutting and/or etching can seal and/or fuse the cut edges. Moreover, laser cut and/or etched edges can be one or both of smooth and level. Laser power and speed of the cutting and/or etching processes commonly affect the degree that cut-edges are one or more of fused, smooth, and level. Furthermore, laser power and speed of the cutting and/or etching process typically affects the degree that the cut edges are substantially free of waviness, sagging and charring. For example, low laser power and/or fast cutting speed can increase the degree of charring. Optimal cutting and/or etching typically requires a balancing of the laser power and line speed to form sharp, clean cut edges. Sharp, clean cut edges are more difficult to achieve by die-cutting, particularly at line speeds equivalent to those achievable by laser cutting and/or etching. Furthermore, the dies need to be routinely replaced and/or sharpened. Commonly, a cutting machine having an optical element to identify a selected reference point, such as when registering is performed in conjunction with cutting and/or etching. The reference point may be identified optically, for example, using reflected laser light in a conventional laser light registration system, as known by those of skill in the art. Optical registration is preferred over using a guide side (or a prior cut line) because some materials lack sufficient dimensionality to use an edge for registration. Once the desired reference point is identified, the cutting and/or etching element cuts and/or etchs out the design image using programmed logic to impart accurate registration and to precisely cut out and/or etch one or more of the decorative articles and any one or more of the decorative elements described herein.

"Elastomeric polymeric materials," "elastomeric polymers," and "elastomeric materials" generally refer to one or more of rubbers, polyisoprenes, polybutadinenes, styrene-butadienes, chloroprenes, ethylene propylene rubbers, ethylene-vinyl acetates, ethylene propylene diene rubbers, polyacrylic rubbers, epichlorohydrin rubbers, fluorosilicones, fluoroelasters, silicones, perfluoroelastomers, polyether block amides, chlorosulfonated polyethylenes and combinations thereof). Non-limiting examples of stretchable and elastic-knits/stretchable and elastic-weaves are sprang waves, mesh-weaves, open weaves, warp knits, and two-way knits. While not wanting to be limited by example, suitable stretchable and elastic-knits/stretchable and elastic-weave textile materials are Lycra™, Spandex™, 4-, 3-, 2-, or 1-way stretch fleece fabrics, and stretch cotton weaves (such as, stretch rayon jersey knit and/or cotton/LYCRA™ combinations).

"Knit" generally refers to a fabric having a series of connected loops. The loops formed in the knitting process are generally made by intertwining yarn, thread, or strips in a series of consecutive loops, called stitches. As each row progresses, a new loop is pulled through an existing loop. The loops are generally easily stretched in different directions. Knitting normally uses one set of yarn, which is worked either horizontally or vertically, not both. Knitting typically has two recognized knitting structures, namely warp and weft knitting. Warp knitting has one set of yarn for each wale, each yarn travelling vertically. Weft knitting has one set of yarn, which travels horizontally across the fabric. The knitted textile can be formed by any knitting process, including but not limited to weft knitting (in which the wales are substantially perpendicular to the course of the yarn), warp knitting (in which the wales and courses are roughly parallel to each other), knit stitch, purl stitch, stockinette, reverse stockinette, garter stitch, seed stitch, right-plaited stitches, left-plaited stitches, flat knitting, circular knitting, a single yarn knit, a plurality of yarns knit, a double knit textile, an uneven knit, a shadow knit, a fair-isle knit, a plaited knit, flat knitting, circular knitting, or felt knitting. Examples of possible knit patterns or constructions include knits and purls, reversible stitch patterns, eyelets and lace, mosaic stitch patterns, multi-color stitch patterns, and the like. Specific examples of patterns include basketweave, basketweave II, box stitch, broken rib, cable stitch, casting on, casting off, checks and ridges, chevron, close checks, decrease, diagonal rib, diagonals, diamond pattern, double basket weave, double seed stitch, elongated chevron, embossed diamonds, embossed moss rib, garter rib, garter stitch, garter stitch steps, increase, Inverness diamonds, King Charles brocade, knit stitch, large diamonds, little pyramids, mistake rib, mock cable, moss diamonds, moss panels, moss stitch, moss stitch border diamonds, moss stitch parallelograms, parallelograms, parallelograms II, pavilion, pique triangles, plain diamonds, purl stitch, purled ladder, rib stitch, rice stitch, seed stitch, single chevron, slip stitch, spaced checks, squares, squares in squares, stocking stitch, thermal underwear stitch, triangles, triangle ribs, triangle squares, triangles, twin rib, two by two rib, windmill, woven stitch, yarn over, and combinations thereof. A preferred decorative element has knit and purl stitches arranged substantially symmetrically (such as in ribbing, garter stitch, or seed stitch) so that the decorative element lies substantially flat.

"Laser engraving", "laser marking", "laser cutting" and/or "laser etching" refer to using lasers to engrave, mark, cut or etch an object. The technique does not generally involve the use of chemicals (such as, inks or corrosive materials), nor does it generally involve tool bits, which contact the engraving surface and wear out. These properties distinguish laser engraving cutting, and/or etching from alternative engraving etching, or marking technologies where inks or bit heads have to be replaced regularly. The impact of laser engraving and/or etching has been more pronounced for specially-designed "laserable" materials. These include laser-sensitive polymers and novel metal alloys. The terms "laser marking" and "laser etching" are also used as a generic term covering a broad spectrum of surfacing techniques including printing, hot-branding and laser bonding. The machines for laser engraving, laser etching, laser cutting, and laser marking are commonly the same, so that the terms are usually interchangeable. A laser engraving machine commonly includes three main parts: a laser, a controller, and a surface. The point where the laser (the terms "laser" and "laser beam" may be used interchangeably) touches the surface should be on the focal plane of the laser's optical system, and is usually synonymous with its focal point. The energy delivered by the laser changes the surface of the material under the focal point. It may heat up the surface and subsequently vaporize the material, or perhaps the material may fracture (known as "glass" or "glass up") and flake off the surface.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A "metalized material" generally refers to one or more of a polymeric composition-containing metalized particles, a polymeric composition having a metalized coating, a polymeric composition having a metalized appearance, a metal-containing composition, and a combination and/or mixture thereof. The metalized material may comprise a molded polyurethane or silicone. Typically, the metalized material comprises molded polyurethane formed by high-frequency molding and/or shaping processes. More typically, the metalized material comprises molded metal-containing polyurethane formed by high-frequency molding and/or shaping processes. The high frequency molding process is commonly a radio frequency molding process. The molded polyurethane may have a single metallic hue. The metal may be any metal. Generally, the metal is silver, nickel, aluminum, or alloys and combinations thereof. The metal may be encapsulated and/or dispersed in the polymeric material. The metal may be coated to provide for additional and/or different hues. For example, the metal can be coated with yellow hue to provide for a gold-like look, or dark orange for copper-like look. Commonly, the metal may be encapsulated and/or dispersed in the polyurethane. While not wanting to be limited by example, the metal may be encapsulated and/or dispersed between two polymeric film layers. The metalized material may or may not include an adhesive layer. The metalized material typically has a metallic surface or metallic-like appearing surface and an opposing surface. The opposing surface may or may not include the adhesive layer. The adhesive layer can be in the form of an adhesive film layer. The metallic-appearing surface is commonly in the form of three-dimensional surface. The three-dimensional surface is formed during the high frequency molding process. Furthermore, edges of the metalized material can formed during the molding process. That is, the edges may be formed using a combination of high frequency energy and/or heat. Furthermore, the edges may be formed during the molding process by the mold die, specifically by the edge of the mold die and the pressure applied during the molding process. The molding process may or may not include welding a textile base to metalized material. Commonly, the metalized material is provided without a textile base. However, when provided with a textile base, the textile base is part of the metalized material. That is, the textile base of the metalized material is not a decorative element as used herein, other than that of the metalized material the textile base is molded thereto. The high frequency molding cannot cut through flock fibers, such as nylon flock fibers, nor through typical textile materials such as polyester-containing textile materials. More specifically, the high frequency molding process cannot cut through polymeric materials having a melting point greater than nylon and/or polyester. Even more specifically, the textile base has a melt temperature of commonly no more than about 190 degrees Celsius, more commonly no more than about 180 degrees Celsius, even more commonly no more than about 170 degrees Celsius. The metalized material can be one or more of pliable, soft and washable. More specifically, the metalized material can be laundered with clothing. The metalized material can be fabricated to resemble a metallic badge, such as, a police officer's badge, a fire department badge, a federal agent's badge or such.

"Polymer" or "polymer composition" generally refers to a molecule comprising a plurality of repeating chemical groups, typically referred to as monomers. Polymers include man-made polymers, natural polymers and mixtures thereof. Polymers are often characterized by high molecular masses. Useful polymers include organic polymers and inorganic polymers both of which may be in amorphous, semi amorphous, crystalline, partially crystalline states, or combinations thereof. Polymers may comprise monomers having the same chemical composition or may comprise a plurality of monomers having different chemical compositions, such as a copolymer. Cross-linked polymers have linked monomer chains. Useful polymers include but are not limited to plastics, elastomers, thermoplastic elastomers, elastoplastics, thermosets, thermoplastics and acrylates. Exemplary polymers include but are not limited to acetal polymers, biodegradable polymers, cellulosic polymers, epoxies, fluoropolymers, polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, nylons, polyacrylonitrile polymers, polyamide, imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyvinyls, polyurethanes, natural and synthetic rubber, silicones, styrenic resins, sulfone based resins, vinyl based resins and any combinations of these.

A "satin" weave and/or satin textile material generally refers to a flat, smoothly woven type weave, such as, but not limited to satin type weaves with an interlacing float of at least 2 or to at least the following satin weave types commonly known within the art as:

a) Brocade—A brocade weave is a compound weave where a supplementary warp or filling yarn is inlaid into a base fabric to produce an embroidered appearance. (The supplementary or filling yarn is a yarn that can be removed without affecting the base fabric.) Brocade weaves can be continuous where the supplementary yarn floats on the back of the base fabric and is not visible on the fabric face, or discontinuous where the supplementary yarn is woven into the patterned areas visible on the fabric face.

b) Brocatelle—A brocatelle weave is a highly textured or high-relief motif produced with an additional yarn the runs between the fabric face and back to produce a pronounced texture, or dimensionality, or relief to the fabric surface. Brocatelle weaves are typically based on, but not limited to, satin weaves.

c) Camocas—A comocas fabric is typically a stain weave with a diapered design.

d) Crepe-back satin, Satin-back crepe, Crepe-satin, or Satin-crepe—These fabrics typically comprise a stain weave on the fabric face and a crepe crinkled affect produced by the weave, yarn or finishing technique on the back of the fabric. Typically weft crepe yarns are twisted and outnumber any supplemental or filling yarn by a factor of at least 2:1.

e) Duchesse—A duchesse weave is a high thread count satin weave, typically woven with fine yarns having a higher density of warp to weft yarns. Duchesse fabrics have a high luster and are highly textured and firm.

f) Satin—A warped-faced satin weave satin weave is a weave where warp yarns pass over multiple weft yarns before interlacing another waft yarn, or filling-faced satin weave where weft yarns pass over multiple warp yarns before interlacing another warp yarn. A satin weave produces a fabric surface where the warp and weft intersection points are as widely spaced as possible. Satins are typically woven with low twist filament yarns.

g) Double-face satin—A double-face satin has two satin constructions, one on the face and another on the back, produced by a weave having two warps and one weft.

h) Paillette satin—A paillette stain is a weave that produces a changeable color affect.

i) Peau de soie—A peau de soie stain weave can be of a single or double construction, typically characterized by a cross-rib texture in the weft direction and a slight luster.

j) Satin-back—A satin-back fabric is characterized by a weave and/or fabric on one side and any other weave or fabric on the opposing fabric side.

k) Satin foaconne—A stain foaconne is a slightly creped fabric with small designs.

l) Slipper satin—A slipper satin is a compact satin that can be brocaded.

m) Velvet satin—A velvet satin comprises a warp-pile satin weave with a short, dense cut pile. The pile consists of a looped yarn on the fabric surface; the loop can be produced by: 1) knotting the yarn at the base of the fabric; 2) weaving the yarn over wires to produce loops at the base of the fabric and cutting the loops to produce a cut pile; or 3) weaving the warp yarn to produce a double cloth and slicing the warp yarns positioned between the two opposing cloth surfaces to produce two cut-pile fabrics.

"Spacer" generally refers to any material positioned below a decorative element. The spacer is generally adhered to the decorative element by an adhesive, such as but not limited to a hot melt adhesive. The spacer is generally smaller than the decorative element. The spacer can provide one or more of: substantially decreases, or eliminates, adhesion of the adhesive to an uneven/textured substrate and the decorative element; substantially decrease, or eliminates, telegraphing of the uneven/textured substrate surface to the decorative element; creates some rigidity and/or integrity to the decorative element so that it is one or both of substantially smooth and flat; creates some space between the uneven/textured substrate surface and the decorative element to provide one or both of a substantially smooth and flat decorative element. The spacer creates a "buffer space" between the decorative element and the uneven/textured substrate.

"Substrate" generally refers to any article to be decorated. The substrate may comprise any material. Non-limiting examples of suitable substrates comprise metallic materials, synthetic or natural polymeric materials, glass-based materials, ceramic materials, leather-based materials and combinations thereof and may or may not be stretchable and/or have elastic properties. The substrate may comprise an item of apparel, typically a stretchable, elastic, and/or bendable item of apparel. Non-limiting examples of stretchable and elastic items of apparel are jerseys, leotards, pants, shirts, blouses, leggings, socks, shoes, under garments, and accessories (such as, but not limited to, hair-bands, wrist bands, head bands, finger bands, ankle bands, finger bands, toe-bands, arm bands, and shoe-laces). The substrate may have a single surface or a plurality of surfaces. Non-limiting examples of a single-surfaced substrate are articles having one of a generally spherical, circular-donut, and elliptical-donut shapes. Non-limiting examples of substrates having a plurality of article surfaces are articles substantially resembling one of a cube, rectangular-box and tetrahedral shapes. The substrate can include one of a hook or loop component of a hook and loop attachment system.

"Textile material" generally refers to one of: a woven textile material; a knitted textile material; a non-woven, non-knitted textile material; a substantially elastomeric textile material; a substantially non-elastomeric textile material; and a combination and/or mixture thereof. The textile material can be a suede-like fabric. Moreover, the textile material can be a microfiber textile material.

"Woven" generally refers to a fabric comprising at least two sets of yarn, thread, or strips, one warp (longitudinal)

and one filling yarn, thread, or strip (transverse or crosswise), normally laced at substantially right angles to each other. Commonly, the yarn, thread, or strips are straight, run parallel either lengthwise (warp threads) or crosswise (weft threads). The weft yarn is commonly interlocked with the warp by passing under then over, one or more warp threads. Elasticity can be increased in woven fabrics when they are woven from yarn containing elastomeric yarn such as elastane (Lycra® from Invista or Dorlastan® from Bayer).

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1 depicts a cross-sectional view of an article according to some aspects of the present disclosure;

FIG. 2 depicts a cross-sectional view of an article according to some aspects of the present disclosure;

DETAILED DESCRIPTION

Figure 3A:
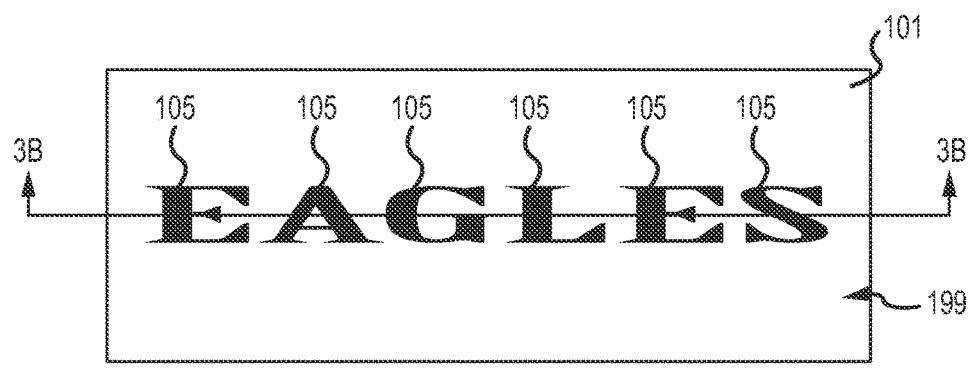
FIG. 3A is an elevation plan view of an article according to some aspects of the present disclosure.

FIG. 1 depicts a cross-sectional view of a decorative article 100 according to various embodiments. The decorative article 100 includes a first layer 101 adhered a second layer 102. The first 101 and second 102 layers may be directly adhered to one another or may be adhered to one another by an adhesive (not depicted).

Figure 3B:
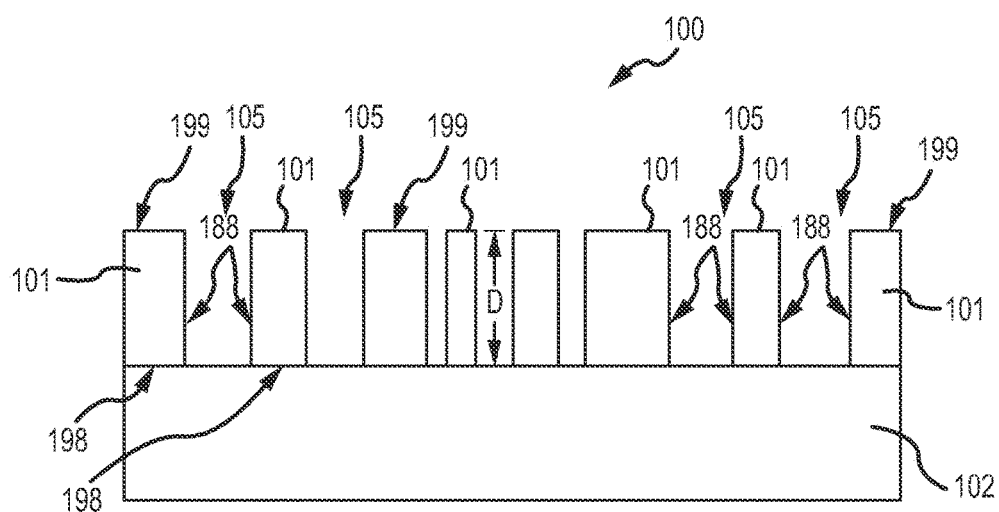
FIG. 3B is a cross-sectional view of FIG. 3A.

FIGS. 2, 3A and 3B depict decorative articles 100 having one or more voids 105 in the first layer 101. In some configurations, a first portion of the second layer surface 104 is visible, to a person viewing the decorative article 100, within the one or more voids 105. The one or more voids 105 can be in the form of apertures having a depth "D" (FIGS. 2 and 3B). Typically, the one or more voids 105 are in the form of alphanumeric characters, graphic design images, or combination thereof. For example, the alphanumeric characters can in the form of letters and/or numbers and the graphic design images can be form of a mascot, company logo, geographic area, or professional insignia to name a few. FIG. 3A depicts an elevation plane view of decorative article 100 having the one or more voids 105 in form of alphanumeric characters, and FIG. 3B depicts a cross-sectional view of FIG. 3A along line 3B-3B. More specifically, FIGS. 3A and 3B depict configurations having the second layer surface 104 visible within the one or more voids 105 to person viewing upper surface 199 of the decorative article 100.

Generally, laser engraving and/or cutting forms the one or more voids 105. That is, the first layer 101 can be etched and/or cut with a laser to form the one or more voids 105. The one or more voids 105 have void walls 188. Commonly, the first layer 101 has a sufficiently high melt and/or softening temperature so that when the first layer 101 is laser etched and/or cut the void walls 188 are formed with a substantially smooth and level wall surface. That is, the void walls 188 are substantially devoid of waves or sags in the wall surface. While not wanting to be limited by theory, it is believed that having a first layer 101 with a sufficiently high melt and/or softening temperatures the void walls 188 do not substantially sag during and/or after the laser etching and/or cutting. Furthermore, the sufficiently high melt and/or softening temperatures provide for substantially sharply delineated void walls 188. Moreover, the void walls 188 are substantially free of char after being formed by the laser cutting and/or etching process. It can be appreciated that in some embodiments, the first layer 101 can be one or more of molded with the one or more voids 105 or die-cut to form the one or more voids.

Figure 4:
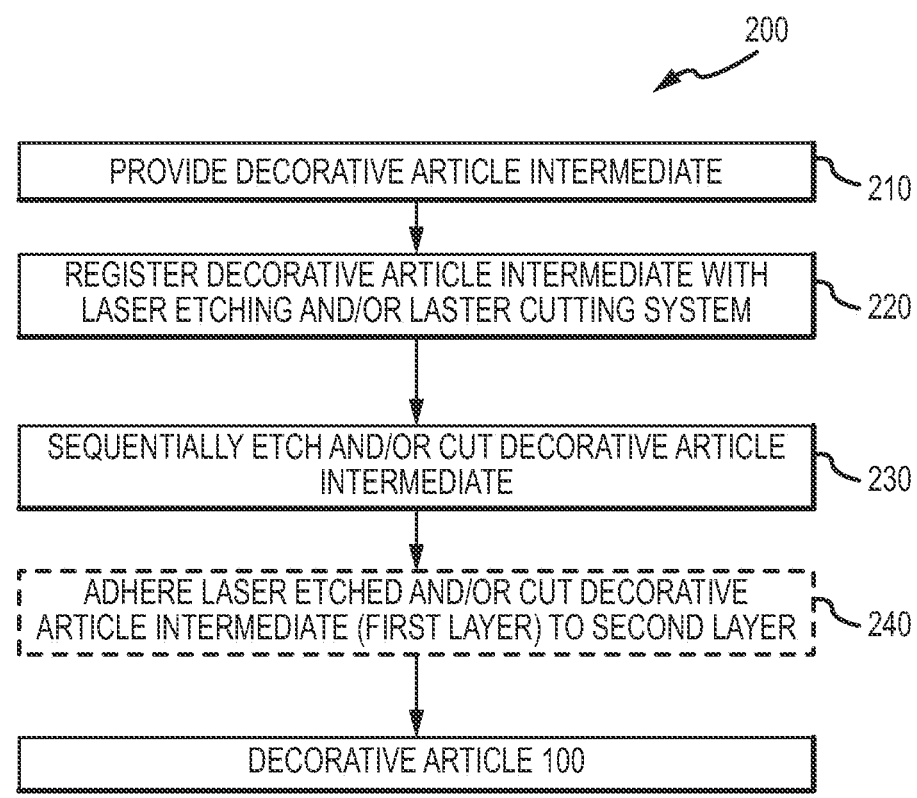
FIG. 4 depicts a process according to some aspects of the present disclosure.

FIG. 4 depicts process 200 for making decorative article 100.

In step 210, a decorative article intermediate is provided for one or both of laser etching and/or laser cutting. The decorative article intermediate can be a first layer 101 adhered to a second layer 102 (FIG. 1) or the first layer 101 alone (that is, with a second layer 102 not adhered to the first layer 101). The decorative article intermediate provided on step 210 can be free of voids 105 or can have voids 105 formed by methods other than laser etching and/or cutting, such as by molding and/or die-cutting.

In step 220, the decorative article intermediate is registered with a laser etching and/or cutting system. The registration can be a mechanical registration, optical registration, electro-mechanical registration, computerized registration, or a combination thereof. The decorative article intermediate is generally to liner base sheet having a low surface energy. The liner base sheet can comprise silicone and TEFLON™. The liner base sheet substantially acts as "release" sheet for holding the decorative article intermediate in place of steps 220 and 230. More specifically, the liner base sheet adheres the decorative article intermediate in position with light handling and easily and cleanly releases the decorative article intermediate when pulled apart.

In step 230, the decorative article intermediate is sequentially etched and/or cut by the laser system. Some of the material comprising the decorative article intermediate is removed by the sequential etching and/or cutting of decorative article intermediate. A laser beam is generated by the laser system. The laser beam is contacted in registration with the decorative article intermediate. The contacting of a laser beam with the decorative article intermediate removes at least some of the material comprising the decorative article intermediate. The contacting of the laser beam sequentially with the decorative article intermediate removes some of material contained in the one or more voids 105 to be formed. The sequential process of contacting the laser beam with decorative article intermediate is continued until substantially all of the decorative article material contained within the one or more voids 105 is removed by the laser etching and/or cutting process. Typically, the contacting of the laser beam with the decorative article intermediate vaporizes at least some of the material contained in the one or more voids 105. When the decorative article intermediate comprises a first layer 101 adhered to a second layer 102, the decorative article 100 is formed by the sequential contacting of the laser beam with the decorative intermediate to create the one or more voids 105.

Typically, one or more sequential passes of the laser beam forms the one or more voids 105. It can be appreciated that a single pass of the laser bean can include one or more laser pulses. It can be appreciated that each sequential pass of the laser beam comprises contacting of the laser beam with the decorative article intermediate.

Generally, each pass of the laser beam in the sequential laser etching and/or cutting process removes more than about 0.5% of the decorative article intermediate material contained in the one or more voids 105. More generally, the each pass of the laser beam removes from about 0.5 to about 1% of the material contained the one or more voids 105. Even more generally, each pass of the laser bean removes from about 1% to about 5%, yet even more generally from about 5 to about 10%, still yet even more generally from about 10% to about 20%, still yet even more generally from about 15 to about 30%, still yet even more generally from about 25 to 40%, still yet even more generally from about 30 to about 50%, or yet still from about 45 to about 100% of the decorative article intermediate material contained in the one or more voids 105.

Typically, the sequential etching and/or cutting of decorative article intermediate comprises no more than twelve sequential passes of the laser beam. However, in some embodiments the sequential etching and/or cutting of the decorative article intermediate comprises more than twelve sequential passes of the laser beam.

The laser etching and/or laser cutting comprises a sufficient laser beam energy level and a sufficient number of passes of laser beam to remove the decorative article intermediate material contained in the one or more voids 105, but little, if any, of the second layer material 102, when the second layer 102 is present during the laser etching and/or laser cutting process.

Regarding optional step 240, this step is included when the decorative article intermediate comprises the first layer 101 without a second layered adhered thereto, the optional step 204 comprises adhering the second layer 101 to the laser etched and/or cut first layer 101.

The first layer 101 may or may not have a metallic appearance. The first layer 101 can be opaque. Typically, the second layer 102 is visible within the one or more voids 105, but not visible through an opaque first layer 101. It can be appreciated that in some embodiments the first layer 101 can have some level of transparency. In such embodiments, the second layer 102 may or may not be visible through the transparent first layer 101. Moreover, the appearance of the second layer 102 in the one or more voids 105 may or may not differ from the appearance of the second layer 102 through the transparent first layer 101. For example, the transparent first layer 101 can have a color or metallic appearance that affects the appearance of the second layer 102 when viewed through the transparent first layer 101. While not wanting to be bound by theory, the second layer 102 may have a yellow color and the transparent first layer 101 a blue color. In such an instance, the second layer 102 in the one or more voids 105 would appear to a viewer to be yellow, but the blue first layer 101 would appear green due to underlying yellow second layer 102.

Typically, the first layer 101 has a metallic appearance. In some embodiments, one or both of the first 101 and second 102 layers have a substantial metallic appearance. The first layer 101 has opposing upper 199 and lower 198 surfaces. The lower surface 198 is, when the first 101 and second 102 layers are stacked, positioned adjacent to the second layer 102. In some embodiments, the upper surface 199 can have a substantially, smooth flat surface. Furthermore, the upper surface 199 can be a dimensionalized surface having three-dimensional profile.

The decorative article 100 can be substantially flexible. That is, the decorative article 100 when adhered to an item of apparel (such as a shirt, jacket, jersey, leggings, pants, or such) can substantially bend and/or flex with the item of apparel during normal activity.

The decorative article 100 can be substantially lightweight and flexible. Metals typically have a density of about 2 g/cm$^3$ or more. Generally, the decorative article of 100 has a metallic appearance and a density of no more than about 1.5 g/cm$^3$, more generally a density of no more than about 1.3 g/cm$^3$, even more generally a density of no more than about 1.2 g/cm$^3$, yet even more generally a density of no more than about 1.1 g/cm$^3$, still yet even more generally a density of no more than about 1.0 g/cm$^3$, more generally, or yet still even more generally a density of no more than about 0.9 g/cm$^3$.

Metals generally have a tensile strength of greater than about 10$^8$ Pascals. Typically, the decorative article 100 has the appearance of a metal and a tensile strength of no more than about $10^7$ Pascals, more generally no more than about $10^6$ Pascals or even more generally no more than about $10^5$ Pascals.

Metals commonly have a modulus of elasticity or flex strength greater than about $10^{10}$ Pascals. Typically, the decorative article 100 has the appearance of a metal and a modulus of elasticity or a flex strength of no more than about $10^9$ Pascals, more generally no more than about $10^8$ Pascals, even more generally no more than about $10^7$ Pascals, or yet even more generally no more than about $10^6$ Pascals.

The first layer 101 can be a decorative metalized film. While not wanting to be limited by example, the decorative metalized film can be a molded metalized film. In one configuration, the decorative metalized film comprises a metal-interposed multi-layer thermoplastic synthetic resin film as described in one or more of U.S. Pat. Nos. 8,110,059; 5,589,022; 5,677,037; 5,599,416; 5,520,988; and 5,143,672, each of which is incorporated in its entirety herein by this reference. It can be appreciated that, the first layer 101 can be one or more of a metal film, a metal film adhered to polymeric film, a polymeric film having a metal distributed throughout the polymeric material, a bi-component film having a polymeric film substantially devoid of metal adhered to polymeric film having a metal distributed throughout the polymeric film, a polymeric film material having three or films adhered together and one of the three is one of a metal film or a polymeric film having a metal distributed throughout the polymeric film, or a combination thereof. In some embodiments, the first layer can be an intermetallic alloy or enamel.

It some configurations, the first layer 101 can comprise one or more metalized layers stacked one on top of another. Moreover, the second layer 102 can be adhered to the first layer 101 having one or more metalized layers stacked one on top of another. The first layer 101 can have a texturized surface. The texturized surface can vary in pattern and/or form over the surface of the first layer 101.

In some embodiments, the first layer 101 can comprise an organic polymeric composition. The organic polymeric composition may or may not contain a metallic material or a material that imparts a metallic appearance to the organic polymeric composition. The organic polymeric composition can be one of polyurethane, polyester and combination thereof.

The organic polymeric composition can comprise a sublimation printable polymeric composition. The sublimation printable polymeric composition can be an organic polymeric sheet material capable of accepting sublimation dyes. While not wanting to be limited by example, the sublimation printable polymeric composition can comprise a polyester, polyester copolymer, polyester polymer alloy, polyester polymer blend or a combination thereof.

Generally, the sublimation printable polymeric composition is substantially free of one or both of poly(cyclohexylene-dimethylene terephthalate) and poly(1,4-cyclohexylene-dimethylene terephthalate). More generally, the sublimation printable polymeric composition contains no more than about 1 wt %, even more generally no more than about 0.5 wt %, or yet even more generally no more than about 0.1 wt % of one or both of poly(cyclohexylene-dimethylene terephthalate) and poly(1,4-cyclohexylene-dimethylene terephthalate). Typically, the sublimation printable polymeric composition is substantially devoid of poly(cyclohexylene-dimethylene terephthalate) and poly(1,4-cyclohexylene-dimethylene terephthalate).

The sublimation printable polymeric composition can be one of a rigid or semi-rigid polymeric sheet material. The sublimation printable sheet can be a rigid or semi-rigid, white polymeric material. The sublimation printable sheet material can comprise a first polymer and a second polymer. In accordance with some configurations, one or both of the first and second polymers can comprise polyester. According some embodiments, the first and second polymers, respectively, have first and second softening temperatures and first and second melt temperatures. The second softening temperature is greater than the first softening temperature and the second melt temperature is greater than the first melt temperature. Commonly, the second softening temperature is more than 50 degrees Fahrenheit greater than the first softening temperature, more commonly more than 100 degrees Fahrenheit greater than the first softening temperature, even more commonly more than 150 degrees Fahrenheit greater than the first softening temperature, or yet even more commonly more than about 200 degrees Fahrenheit greater than the first softening temperature. Typically, the second softening temperature is more than 50 degrees Fahrenheit greater than the first melting temperature, more typically more than 100 degrees Fahrenheit greater than the first melting temperature, even more typically more than 150 degrees Fahrenheit greater than the first melting temperature, or yet even more typically more than about 200 degrees Fahrenheit greater than the first melting temperature. While not wanting to be limited by theory, at least one of first or second polymers generally has a melt or softening temperature of more than about 350 degrees Fahrenheit, more generally a melt or softening temperature of more than about 375 degrees Fahrenheit, even more generally a melt or softening temperature of more than about 400 degrees Fahrenheit, yet even more generally a melt or softening temperature of more than about 425 degrees Fahrenheit, or still yet even more generally a melt or softening temperature of more than about 450 degrees Fahrenheit.

Generally, the first and second polymers are substantially free of one or both of poly(cyclohexylene-dimethylene terephthalate) and poly(1,4-cyclohexylene-dimethylene terephthalate). More generally, the individually or together the first and second polymers contain no more than about 1 wt %, even more generally no more than about 0.5 wt %, or yet even more generally no more than about 0.1 wt % of one or both of poly(cyclohexylene-dimethylene terephthalate) and poly(1,4-cyclohexylene-dimethylene terephthalate). Typically, the first and second polymers are substantially devoid of poly(cyclohexylene-dimethylene terephthalate) and poly(1,4-cyclohexylene-dimethylene terephthalate).

It is believed that having a sublimation printable polymeric composition comprising a polymer having a softening temperature of more than about 350 degrees Fahrenheit can substantially improve the sublimation printed image quality. For example, the sharper images and/or finer, sharper lines can be sublimated printed on polymeric compositions and/or polymeric sheet materials having a softening temperature more than about 350 degrees Fahrenheit compared to polymeric sheet materials substantially lacking a polymer having a softening temperature of more than about 350 degrees Fahrenheit.

The organic polymeric composition can be in the form of a sublimation printable polymeric coating. A glossy clear film can be applied to the sublimation printable polymeric coating. Furthermore, the glossy clear film can be positioned on the printable polymeric coating surface.

The organic polymeric composition can contain a sublimation printed image. Typically, the sublimation printed image quality of the organic polymeric composition is substantially superior to the sublimation dye print quality on textiles, flock, or other free standing polymeric films. The sublimation dye printed image on the organic polymeric composition is one or more of substantially sharper, clearer, and cleaner with more true and vibrant color then sublimation dyed printed images on textiles or other polymeric films.

Figure 5:
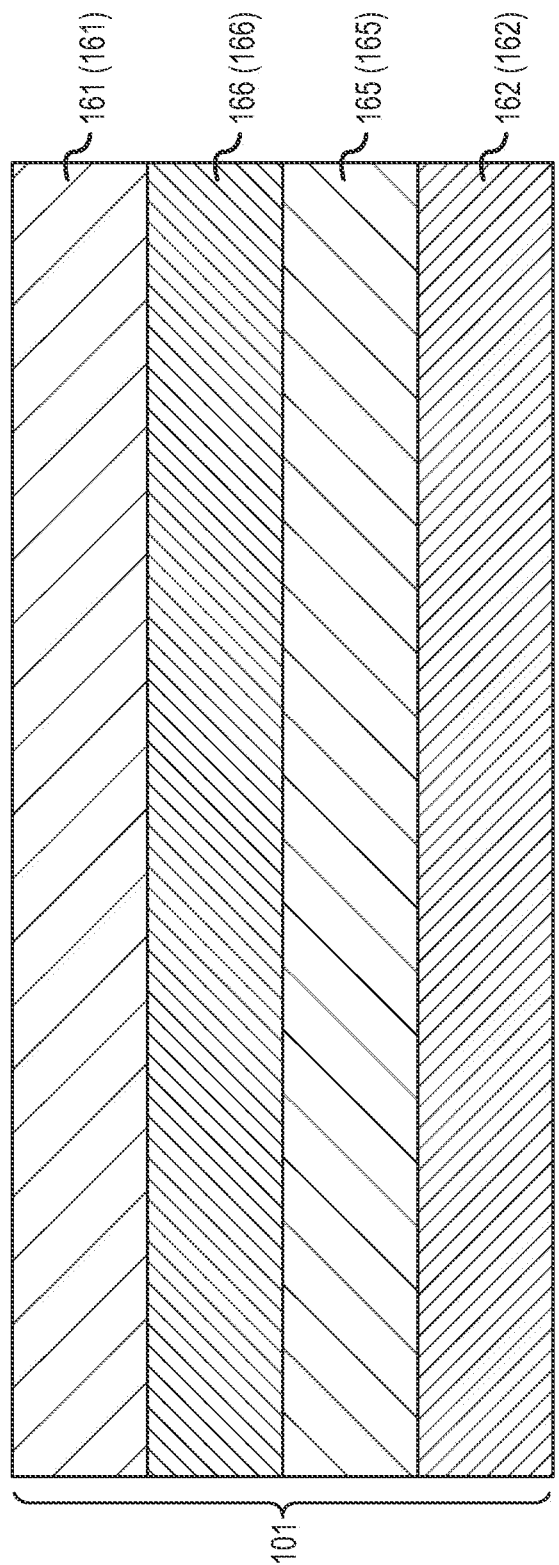
FIG. 5 depicts a cross-sectional view of a decorative element according to some aspects of the present disclosure.

FIG. 5 depicts a first layer 101 having one of metalized film, an organic polymeric composition, a sublimation printable polymeric composition, or combination thereof layer 166 interposed between upper 161 and lower 162 optically transmissive layers. At least most of the visible light portion of the electromagnetic spectrum can be passed by the upper 161 and lower 162 optically transmissive layers. Typically, the upper 161 and lower 162 optically transmissive layers comprise thermoplastic synthetic resin films. A color-enhancing layer 165 can be positioned between the upper 161 and lower 162 optically transmissive layers. The color-enhancing layer 165 can be, for example, a translucent color-containing ink layer. Moreover, the color-enhancing layer 165 can contain one or more additional coats of a clear optically transmissive ink. A non-limiting example of a color-enhancing layer 165 is a translucent colored-ink printed over a metalized base film, such as silver metalized base film. It can be appreciated that the perceived value of the decorative article 100 is substantially enhanced when the color reflected back to a viewer is enriched by the of brilliance of the reflected metallized color. Furthermore, one or both of the upper optically transmissive layer 161 and one or more additional coats of the clear optically transmissive ink on the color-enhancing layer protect the color components of the first layer 101 from damage and/or degradation.

It can be appreciated that in some embodiments, the one of metalized film, an organic polymeric composition, a sublimation printable polymeric composition, or combination thereof layer 166 is positioned between upper optically transmissive layer 161 and the color-enhancing layer 165, and the color-enhancing layer 165 is positioned between the lower optically transmissive layer 162 and the one of metalized film, an organic polymeric composition, a sublimation printable polymeric composition, or combination thereof layer 166. Furthermore, in some embodiments, the color-enhancing layer 165 is positioned between upper optically transmissive layer 161 and the one of metalized film, an organic polymeric composition, a sublimation printable polymeric composition, or combination thereof layer 166, and the one of metalized film, an organic polymeric composition, a sublimation printable polymeric composition, or combination thereof layer 166 is positioned between the lower optically transmissive layer 162 and the color-enhancing layer 165.

The second layer 102 can comprise one of an adhesive layer, a woven textile, a knitted textile, or a polymeric layer. The polymeric layer can be one or more of a metal layer, a metal layer adhered to polymeric layer, a polymeric layer having a metal distributed throughout the polymeric layer, a two-layer film having a polymeric layer substantially lacking a metal adhered to a polymeric layer having a metal distributed throughout the polymeric layer, a layered-material having three or more layers adhered together and at least one of the layers is one of a metal layer or a polymeric layer having a metal distributed throughout the polymeric layer, intermetallic alloy, enamel, or a combination thereof.

The second layer 102 can comprise one of a thermoplastic adhesive layer, a thermosetting adhesive layer, or an adhesive layer having thermoplastic and thermosetting adhesive properties. The thermosetting adhesive layer can be one of an A-stage thermosetting adhesive layer, a B-stage thermosetting adhesive layer or a C-staged thermosetting adhesive layer. The adhesive layer can be a hot melt adhesive. The adhesive layer can comprise in the form of single adhesive layer, a bi-layered adhesive or a tri-layered adhesive. The bi-layered adhesive can comprise a first adhesive stacked on a second adhesive. The tri-layered adhesive can comprise a metal or polymeric sheet positioned between first and second adhesive layers. The first and second adhesive layers in the bi-layered adhesive and tri-layered adhesive can differ in chemical and/or physical properties or can have substantially similar chemical and/or physical properties.

The adhesive composition comprising the adhesive layer can have at one or both of its softening and melt temperatures a substantially high viscosity. In the absence of shear force, the adhesive composition at one or both of its softening and melt temperatures can have substantially little, if any, flow.

The second layer 102 can comprise a polyester composition. Furthermore, the second layer 102 can comprise a polyester material containing one or more dyes, pigments, or combinations thereof. The one or more dyes, pigments, or combination thereof can impart a color to the polyester composition. The second layer 102 can have a color and/or color value that differs from the color and/or color value of the first layer 101. More specifically, the color and/or color value of the second layer 102 can differ from the color and/or color value of the first layer 101. Even more specifically, the color and/or color value of the first layer 101 can contrast with the color and/or color value of the second layer 102.

The second layer 102 can comprise a polyurethane composition. Furthermore, the second layer 102 can comprise a polyurethane material containing one or more dyes, pigments, or combinations thereof. The one or more dyes, pigments, or combination thereof can impart a color to the polyurethane composition. The second layer 102 can have a color and/or color value that differs from the color and/or color value of the first layer 101. More specifically, the color and/or color value of the second layer 102 can differ from the color and/or color value of the first layer 101. Even more specifically, the color and/or color value of the first layer 101 can contrast with the color and/or color value of the second layer 102.

Figure 6:
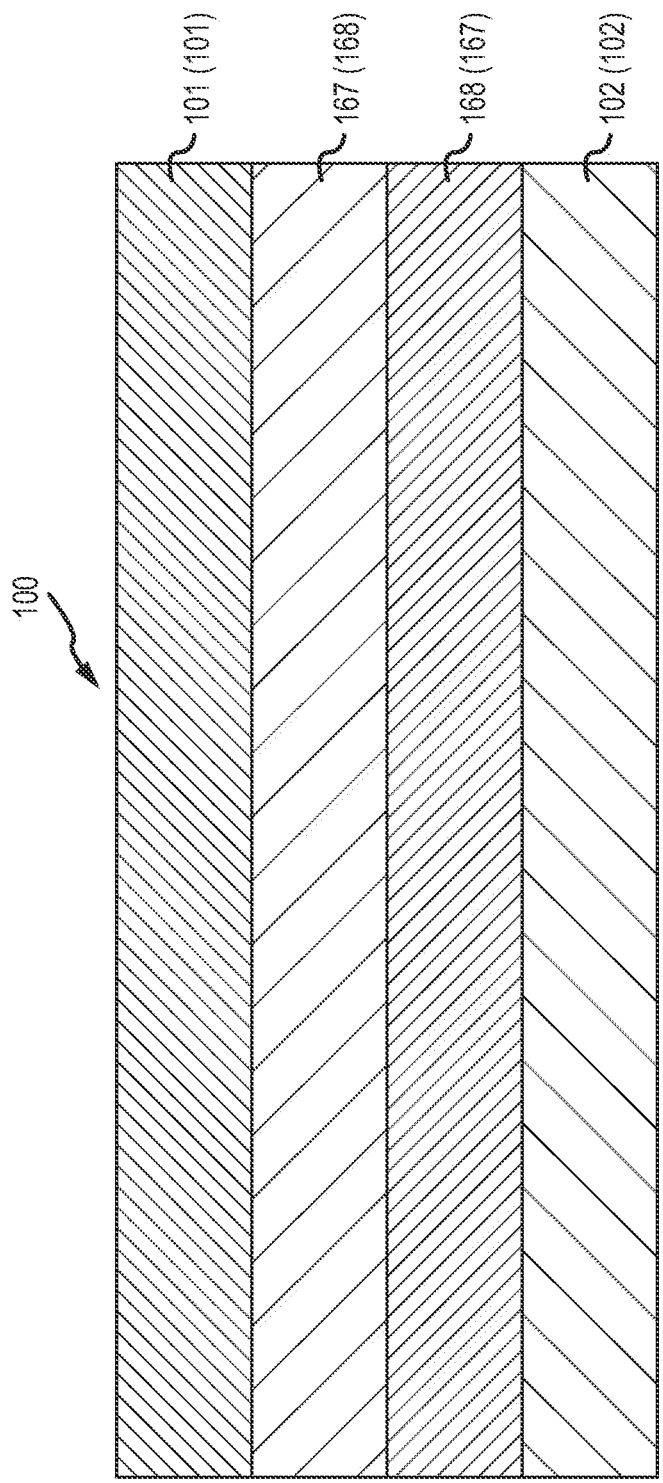
FIG. 6 depicts a cross-sectional view of a decorative article according to some aspects of the present disclosure.

FIG. 6 depicts decorative article 100 having a second layer 102 further comprising an optically transmissive layer 167. The transmissive layer 167 positioned adjacent to the first 101 layer. At least most of the visible light portion of the electromagnetic spectrum can be passed by the optically transmissive layer 167. Typically, the optically transmissive layer 167 comprises a thermoplastic synthetic resin film. Furthermore, the optically transmissive layer 167 can include a color-enhancing layer 168 positioned between the optically transmissive layer 167 and second layer 102. The color-enhancing layer 168 can be, for example, a translucent color-containing ink layer. Moreover, the color-enhancing layer 168 may contain one or more additional coats of a clear optically transmissive ink. A non-limiting example of a color-enhancing layer 168 is a translucent colored-ink printed over a metalized base film, such as silver metalized base film. It can be appreciated that the perceived value of the decorative article 100 is substantially when the enhanced when the color reflected back to a viewer is enriched by the brilliance of the reflected metallized color. Furthermore, one or both of the optically transmissive layer 167 and one or more additional coats of the clear optically transmissive ink protects the color-enhancing layer 168 from damage and/or degradation. It can be appreciated that in some embodiments, the optically transmissive layer 167 positioned between upper layer 101 and the color-enhancing layer 168, and the color-enhancing layer 168 is positioned between the second layer 102 and the optically transmissive layer 167. Furthermore, in some embodiments, the color-enhancing layer 168 is positioned between upper layer 101 and the optically transmissive layer 167, and the optically transmissive layer 167 is positioned between the color enhancing layer 168 and the second layer 102.

It can be appreciated that one or both of the optically transmissive layer 167 and the color enhancing layer 168 may or may not have adhesive properties. In some embodiments, the optically transmissive layer 167 has adhesive properties. In some embodiments, the color enhancing layer 168 has adhesive properties. Moreover, the optically transmissive layer 167 can be heat sealed and/or laminated to the color enhancing layer 168 and one of the first 101 and second 102 layers. In some embodiments an adhesive is printed on the optically transmissive layer 167, in the zones where laser etching is not to preformed, to adhere to the color enhancing layer 168 and one of the first 101 and second 102 layers. Furthermore, the color enhancing layer 168 can be heat sealed and/or laminated to the optically transmissive layer 167 and one of the first 101 and second 102 layers. In some embodiments an adhesive is printed on the color enhancing layer 168, in the zones where laser etching is not to preformed, to adhere to the optically transmissive layer 167 and one of the first 101 and second 102 layers.

The decorative article 100 can be heat sealed to a substrate. After the heat sealing of the decorative article 100 to the substrate, the substrate is substantially permanently adhered to the decorative article 100. The substrate can include any item of commerce. Suitable substrates include without limitation apparel, automotive components and elements, electronic components and devices, household items, electrical devices and components, luggage, personal devices and accessories (such as purses, wallets, and such), to name a few. Items of apparel can be hats, gloves, shoes, stockings, pants, jackets, jersey, shirts, blouses, coats, neckties, skirts, vests, and so forth. The decorative element 100 heat sealed to substrate is substantially wash resistant. That is, decorative article 100 remains substantially adhered to the substrate after about 100 standard wash cycles.

Figure 7:
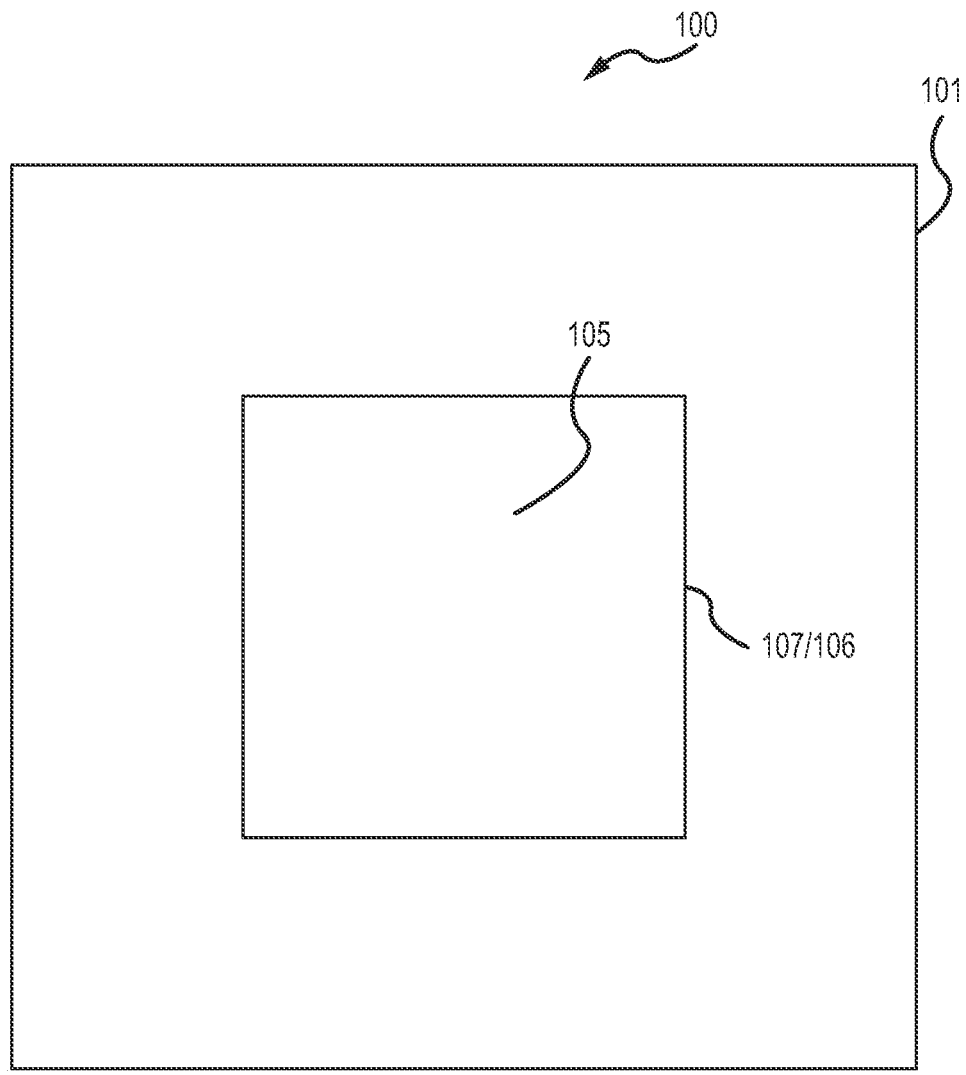
FIG. 7 is an elevation plan view of a decorative article according to some aspects of the present disclosure.
Figure 8:
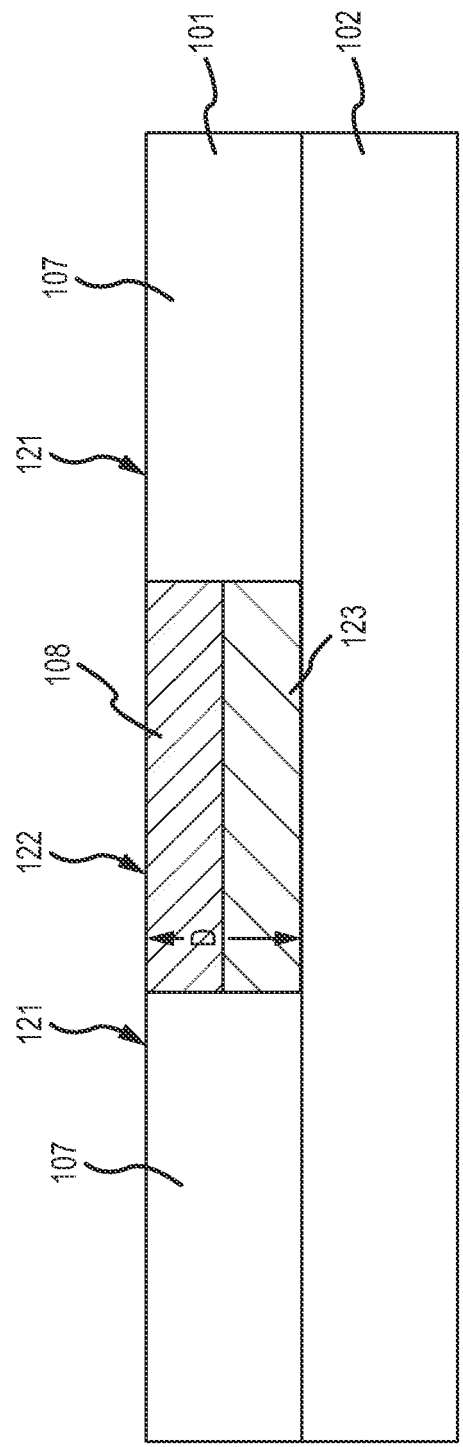
FIG. 8 depicts a cross-sectional view of a decorative article according to some aspects of the present disclosure.
Figure 9:
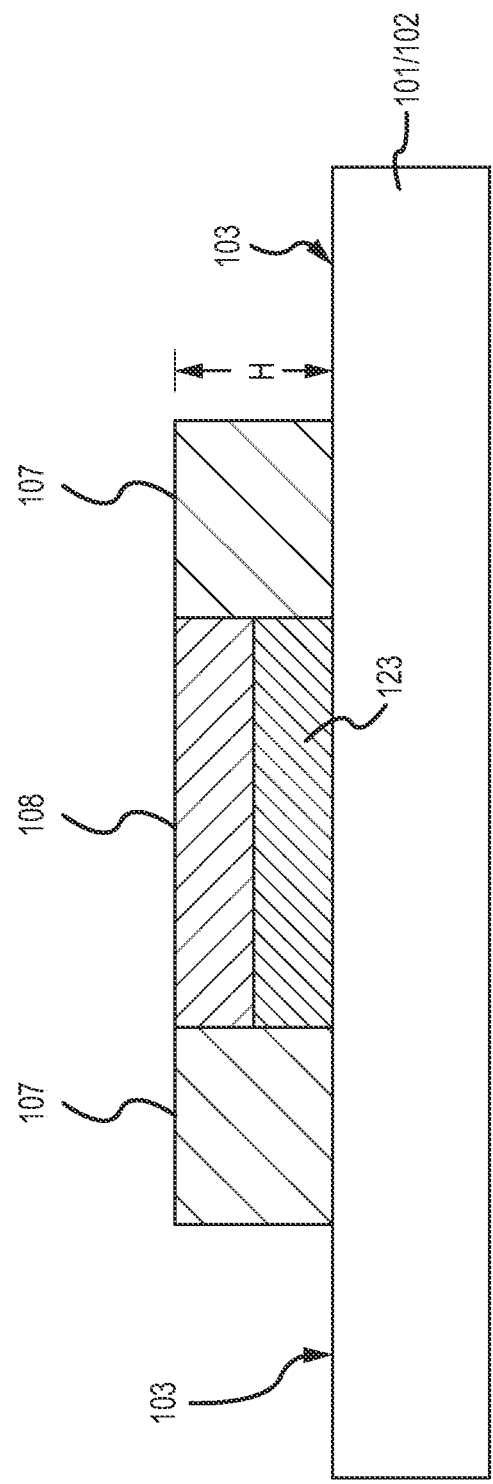
FIG. 9 depicts a cross-sectional view of a decorative article according to some aspects of the present disclosure.

The one or more voids 105 can be in the form of apertures having a depth "D" (FIGS. 2, 3B, 7, and 8) and/or in the form of one or more raised borders 107 having a height of "H" (FIGS. 7 and 9). The raised borders 107 can define one or more voids 105.

The one or more raised borders 107 can comprise part of the first layer 101. The one or more raised borders 107 can define a perimeter 106 of one or more voids 105. To a person viewing the decorative article 100, a first portion of the second layer surface 104 may or may not be visible within the void 105. In some configurations, a portion of the first layer surface is visible within the one or more voids 105 to person viewing the decorative article 100. Outside of the perimeter 106 is viewable surface 103. The viewable surface 103 may comprise one of a second portion of the second layer surface, a portion of the first layer surface, a substrate surface (not depicted), or a combination thereof.

An insert 108 can be positioned in some or all of the one or more voids 105 define by one or both of the apertures and raised borders 107. Referring to FIGS. 8 and 9, the decorative article 100 can have the insert 108 positioned in a void 105. In FIG. 9, the insert 108 is adhered by adhesive layer 123 to the raised borders 107 and one of the first 101 and second 102 layers. The raised border 107 substantially surrounds the insert 108 to hide the adhesive layer 123 and edge of the insert 108 from view. Furthermore, the adhesive layer 123 and insert 108 are substantially protected from wear or damage by the raised border 107. Accordingly, the raised border 107 can protect the insert 108 from delimitation. The height "H" of the raised border 107 above the surrounding surface 103 of one of the first 101 and second 102 layers is generally at least as high as the collective thickness of the insert 108 and adhesive layer 123. In FIG. 8, the insert 108 is adhered by adhesive layer 123 to the first layer 101 containing the void 105 and to one of the first 101 and second 102 layers. The first layer 101 substantially surrounds the insert 108 to hide the adhesive layer 123 and edge of the insert 108 from view. Furthermore, the adhesive layer 123 and insert 108 are substantially protected from wear or damage by the first layer 101 that surrounds the adhesive layer 123 and insert 108. Accordingly, the first layer 101 can protect the insert 108 from delimitation. The depth "D" of the void in the first layer 101 is generally at least as high as the collective thickness of the insert 108 and adhesive layer 123.

The insert 108 visible to a viewer can be positioned within the one or more voids with the top surface 122 of insert 108 is substantially flush with the top surface 121 of the first layer 101 and/or the one or more raised borders 107 (FIGS. 8 and 9). In such configurations, the insert 108 can be adhered to one of the first 101 and second 102 layers by an adhesive 123.

The decorative article 100 can be adhered to an optional backing adhesive (not depicted). The decorative article 100 can be adhered to a substrate (not depicted) by the backing adhesive.

It can be appreciated that in construction of decorative articles, limitations are imposed by the need to have borders around each color to contain the color and thereby avoid colors flowing into one another. The various decorative articles 100 of FIGS. 1, 2, 3A, 3B and 5-9 can avoid this problem by using one or more multi-colored decorative elements as inserts within one or more voids. The decorative element can be formed into a three dimensional design, such as by thermoforming or etching, thereby providing the decorative element with the desired three-dimensional relief. This can obviate the need to have complex and expensive dies for construction of the decorative element. In other words, a blank could be formed as a planar object, with the three-dimensional relief being provided by the decorative element(s).

The insert 108 and/or first portion of the second layer surface 104 visible within the one or more voids 105 can be framed by the first layer 101 surrounding the one more voids 105. In some configurations, the insert 108 and/or first portion of the second layer surface 104 is positioned within the one or more voids 105 and recessed below top surface 121 of the first layer 101 and/or the one or more raised borders 107. The top surface 121 and the insert 108 and/or first portion of the second layer surface 104 being visible to the viewer of the decorative article 100.

The insert 108 and/or a first portion of the second layer surface 104 can comprise a polymerically coated aluminum metal element. Preferably, the polymerically coated aluminum metal element. The polymerically coated aluminum metal element can comprise a sublimation dye printable polymeric coating position on and/or adjacent to an aluminum metal substrate. The sublimation printable polymeric material is cured and substantially permanently adhered to the aluminum metal substrate. Commonly, an insert 108 comprising the polymerically coated aluminum metal element contains a sublimation printed image.

An exemplary polymerically coated aluminum metal element is sold under the tradename UNISUB® (a registered mark of Universal Woods, Inc.). It is believed that UNISUB® is polymeric laminate comprises aluminum metal coated with a polymeric material. The polymeric laminate includes sublimation dyeable polymeric coating and a white-colored polymeric coating. The sublimation dyeable polymeric coating is typically positioned on at least one surface of the polymerically coated aluminum metal element. More commonly, the sublimation dyeable polymeric coating is typically positioned on opposing surfaces of the polymerically coated aluminum metal element, even more commonly all surfaces of the polymerically coated aluminum metal element are coated with the sublimation dyeable polymeric coating. The white-colored polymeric coating is positioned between the aluminum metal and the sublimation dyeable polymeric coating. A glossy clear film can be applied to the sublimation dyeable polymeric coating. Furthermore, the clear glossy clear film can be positioned on the dyeable polymeric coating surface opposing the dyeable polymeric coating surface in contact with the white-colored coating. Moreover, the polymeric coated aluminum metal can be laser cut to any desired shape.

Commonly, the polymerically coated aluminum metal element has a thickness of no more than about 10 mm. More commonly, the polymerically coated aluminum metal element has a thickness of no more than about 9 mm, even more commonly of more than about 8 mm, yet even more commonly of no more than about 7 mm, still yet even more commonly of no more than about 6 mm, still yet even more commonly of no more than about 5 mm, still yet even more commonly of no more than about 4 mm, still yet even more commonly of no more than about 3 mm, still yet even more commonly of no more than about 2 mm, still yet even more commonly of no more than about 1 mm, still yet even more commonly of no more than about 0.5 mm, still yet even more commonly of no more than about 0.25 mm, still yet even more commonly of no more than about 0.1 mm, or yet still even more commonly of no more than about 0.05 mm. In some configurations, the polymerically coated aluminum element typically has a thickness of more than about 10 mm.

The polymerically coated aluminum metal element is normally dimensionally stable. That is, the thickness of the polymerically coated aluminum metal element is substantially sufficient for the aluminum metal element to lie flat, and stay substantially flat during use of the decorative article 100.

The polymerically coated aluminum metal element is preferably wash resistant. That is, the sublimation dye printed image contained in polymerically coated aluminum metal element is substantially maintained after about 100 standard laundry washings. Furthermore, when the polymerically coated aluminum metal element is adhered to a hybrid article, the polymerically coated aluminum metal element remains adhered to decorative article 100 after about more than 100 standard laundry washings.

Typically, the sublimation dye print quality of the polymerically coated aluminum element is substantially superior to the sublimation dye print quality on textiles, flock, or free standing polymeric films. Sublimation dye printed images on the polymerically coated aluminum metal element are one or more of substantially sharper, clearer, and cleaner with more true and vibrant color then sublimation dyed printed images on textiles. Moreover, the sublimation dye printed polymerically coated aluminum metal element is substantially more durable than sublimation dye printed textiles and flock. That is, the sublimation dye printed image contained in polymerically coated aluminum metal element is substantially maintained after about 100 standard laundry washings. Furthermore, when the polymerically coated aluminum metal element is adhered to a hybrid article, the polymerically coated aluminum metal element remains adhered to decorative article 100 after about more than 100 standard laundry washings.

The insert 108 can comprise a polymeric material containing a hologram. The hologram-containing insert 108 can provide a level of authentication of the decorative article 100. While not wanting to be limited by example, a decorative article 100 in the form of a security badge having a hologram-containing insert 108 can be easily authenticated and difficult to reproduce.

The insert 108 can be a sublimation printable sheet material. The sublimation printable sheet material can be a polymeric sheet material capable of accepting sublimation dyes. The sublimation printable sheet material can be one of a rigid or semi-rigid polymeric material. More specifically, the sublimation printable sheet material can be one of a rigid or semi-rigid, white polymeric material.

In some configurations, the sublimation printable sheet material comprises a first polymer and a second polymer. While not wanting to be limited by example, the sublimation printable sheet material can comprise a polyester, polyester copolymer, polyester polymer alloy, polyester polymer blend or a combination thereof. That is, in accordance with some configurations, one or both of the first and second polymers comprise polyester.

The first and second polymers, respectively, have first and second softening temperatures and first and second melt temperatures. The second softening temperature is greater than the first softening temperature and the second melt temperature is greater than the first melt temperature. Commonly, the second softening temperature is more than 50 degrees Fahrenheit greater than the first softening temperature, more commonly more than 100 degrees Fahrenheit greater than the first softening temperature, even more commonly more than 150 degrees Fahrenheit greater than the first softening temperature, or yet even more commonly more than about 200 degrees Fahrenheit greater than the first softening temperature. Typically, the second softening temperature is more than 50 degrees Fahrenheit greater than the first melting temperature, more typically more than 100 degrees Fahrenheit greater than the first melting temperature, even more typically more than 150 degrees Fahrenheit greater than the first melting temperature, or yet even more typically more than about 200 degrees Fahrenheit greater than the first melting temperature.

While not wanting to be limited by theory, at least one of first or second polymers generally has a melt or softening temperature of more than about 350 degrees Fahrenheit, more generally a melt or softening temperature of more than about 375 degrees Fahrenheit, even more generally a melt or softening temperature of more than about 400 degrees Fahrenheit, yet even more generally a melt or softening temperature of more than about 425 degrees Fahrenheit, or still yet even more generally a melt or softening temperature of more than about 450 degrees Fahrenheit. It is believed that having a sublimation printable sheet material comprising a polymer having a softening temperature of more than about 350 degrees Fahrenheit can substantially improve the sublimation printed image quality. For example, the sharper images and/or finer, sharper lines can be sublimated printed on sheet material comprising a polymer having a softening temperature more than about 350 degrees Fahrenheit compared to a sheet material substantially lacking a polymer having a softening temperature of more than about 350 degrees Fahrenheit.

The insert 108 can be according to some configurations a metalized polymeric material. The metalized polymeric material of insert 108 commonly has one or both of a different metallic color and a texturized surface than one of the first 101 and second 102 layers.

The insert 108 can be according to some configurations a knitted or woven textile. The woven and/or knitted material can contain a sublimation printed image.

According to some configurations the insert 108 can include a polymeric fill material. The polymeric fill material can comprise any polymeric material. Typically, the polymeric fill material is positioned in the one or more of the voids 105 in the form of a liquid and/or paste material. The polymeric fill material, after positioning the polymeric fill material in the one or more voids, is solidified and/or cured.

While not wanting to be limited by theory, the polymeric fill material can be thermoplastic polymeric fill material. The thermoplastic polymeric fill material can be positioned in the one or more voids 105 while the thermoplastic polymeric fill material is substantially at or above its melt temperature. The thermoplastic polymeric fill material, after being positioned in the one or more voids 105, can be cooled to solidify the thermoplastic polymeric fill material within the one or more voids 105.

The polymeric fill material can be a thermosetting-polymeric fill material. The thermosetting-polymeric fill material can be positioned in the one or more voids 105 while substantially in one of A- or B-stage. The thermosetting-polymeric fill material after being positioned in the one or more voids 105 can be one of cured or cooled to solidify the thermosetting-polymeric fill material within the one or more voids 105. For example, the thermosetting-polymeric material contained with the one or more voids 105 can be solidified within the one or more voids 105 by substantially curing and/or C-staging the thermosetting polymeric fill material.

The polymeric fill material can have a colored and/or metallic like appearance. It can be appreciated that can one of partially or substantially completely fill the one or more voids 105.

The first 101 and second 102 layers can be positioned side-by-side or stacked one on top of the other as further described herein and/or in U.S. patent application Ser. No. 13/625,797, filed Sep. 24, 2012, which is incorporated fully herein by this reference. A thermosetting or thermoplastic adhesive can adhesively join the first 101 and second 102 layers. The adhesive can be in the form of an adhesive layer positioned between the first 101 and second 102 layers. The metalized film of one or both of the first 101 and second 102 layers can have a texturized surface. The pattern and/or form of the texturized surface can vary over one or both of the first 101 and second 102 layers.

In another configuration, an intermediate layered structure, such as a metalized film and flock and/or a textile (in a stacked or side-by-side configuration), is thermoformed in a, typically closed metal, die and optionally one or more of the decorative elements are dimensionalized to provide a highly attractive decorative article. In one application, flock is adhered, by one or both of a thermoplastic adhesive and an A-, B- or C-staged thermosetting adhesive to a surface of the metalized film, which assembly is placed in a metal die and thermoformed. Not only is the flock more tightly adhered to the metalized film by the process but also the assembly can be formed into a nonplanar, three-dimensional article through thermoforming. An added benefit is that the flock and/or metalized film is/are precisely cut by the die during thermoforming. The flock can also be dimensionalized by and during thermoforming.

Figure 10:
FIG. 10 is an elevation plan view of a decorative article according to some aspects of the present disclosure.

FIG. 10 depicts a decorative article 100 according to an aspect of the present disclosure. The hybrid article comprises a metalized material 1310 and dyed layer film 1320. The metalized material 1310 has a texturized surface 1315 containing one or more voids 105. Positioned in the one or more voids 105 is an insert exposed surface 104 of the color-enhancing layer 168. It can be appreciated that has a plurality of texturized surfaces having differing attractive patterns 1315*a*, 1315*b*, etc. The decorative article 100 further includes a wall 107 containing an insert 108.

An example of a decorative article 100 is a pin-backed badge. The decorative article 100 can be used as patch to be sewn on to substrate. Moreover, the decorative article 100 can be backed with a pressure sensitive adhesive for use as a stick-on patch or backed with a heat sealed adhesive film for heat application to a desired substrate.

In some configurations, taking the shape of the substrate is desirable, but taking the shape of an underlying seam or contour is not. In such configurations, the metalized film can include a thin spacer having substantially sufficient flexibility to conform to the general shape of the substrate but substantially sufficient rigidity to not substantially conform to substrate irregularities, such as seams, channels and/or grooves. Non-limiting examples of such a thin spacer are thin mylar films and silicon foam pads. In some configurations, the thin spacer has a sufficiently high softening temperature so as to substantially conform to substrate irregularities during lamination. While not wanting to be bound by theory, it is believed that the high softening temperature of the thin spacer prevents the thin spacer from softening during lamination and conforming to the substrate irregularities when one or both of heat and pressure are applied during lamination. Similarly, lesser amounts of heat and/or pressure can be applied to the spacer and/or metalized film positioned about the substrate irregularities to decrease and/or eliminate the confirming of the metalized film to substrate irregularities.

The thin spacer many be applied to some or all of the metalized film. In some configurations, the tin spacer may be applied to a portion of metalized film in contact with the substrate irregularities. Furthermore, in some configurations, the thin spacer is positioned between the metalized film and the substrate. A first spacer surface of the thin spacer is adhesively bond to the metalized film by a first spacer adhesive. The thin spacer has a second spacer surface in an opposing relationship to the first spacer surface. The second spacer surface may or may not have a second space adhesive positioned on it. In some configurations, the second surface of the thin spacer (that is, the thin spacer surface positioned nearest the substrate) is substantially free of adhesive about the portion of the thin spacer positioned above the substrate irregularities. However, the second surface of thin spacer not positioned about the substrate irregularities may include a second spacer adhesive. The thin spacer and metalized film are adhered to the substrate by the second spacer adhesive. It can be appreciated, that the thin spacer and metalized film are not adhered to the substrate irregularity. As such, the thin spacer and metalized film do not substantially conform with the surface irregularity. Furthermore, it is believed that the thin spacer and metalized film can move substantially freely about the substrate irregularity.

A number of variations and modifications of the disclosure can be used. It would be possible to provide for some features of the disclosure without providing others.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A decorative article, comprising:
an adhesive layer; and
a metalized flexible polymeric layer, wherein the adhesive layer comprises polyurethane, wherein the adhesive layer has a color, wherein the adhesive layer is adhered to the metalized flexible polymeric layer, wherein the metalized flexible polymeric layer has one or more voids, wherein the metalized flexible polymeric layer is positioned on a decorative surface to be visible to a viewer; and a portion of the adhesive layer is visible, within the one or more voids, to the viewer.

2. The decorative article of claim 1, further comprising:
an item of apparel, wherein the metalized flexible polymeric layer is adhered to the item of apparel by the adhesive layer.

3. The decorative article of claim 1, wherein the metalized flexible polymeric layer has one or more of the following properties:
i) a density of no more than about 1.5 g/cm$^3$;
ii) a tensile strength of no more than about $10^7$ Pascals; and
iii) a modulus of elasticity or flex strength of no more than about $10^9$ Pascals.

4. The decorative article of claim 1, wherein the metalized flexible polymeric layer comprises a metalized film having a metallic appearance.

5. The decorative article of claim 1, wherein the metalized flexible polymer layer comprises polyurethane.

6. The decorative article of claim 1, the one or more voids have substantially smooth and level void walls.

7. The decorative article of claim 1, wherein the metalized flexible polymeric layer comprises a high frequency molded polymeric material.

8. The decorative article of claim 1, wherein the adhesive layer is not visible through the metalized flexible polymeric layer.

9. The decorative article of claim 1, further comprising:
an optically transmissive layer positioned between the metalized flexible polymeric layer and the adhesive layer.

10. The decorative article of claim 9, wherein the optically transmissive layer comprises a thermoplastic resin film.

11. The decorative article of claim 9, further comprising:
a color-enhancing layer positioned between the optically transmissive layer and the adhesive layer, wherein the color-enhancing layer comprises a translucent color-containing ink layer.

12. The decorative article of claim 1, further comprising:
an item of apparel, wherein the metalized flexible polymeric layer is adhered to the item of apparel by the adhesive layer.

13. A method, comprising:
providing a decorative article intermediate comprising a flexible polyurethane layer having a metallic appearance;
registering the flexible polyurethane layer with a laser etching system; and
etching the flexible polyurethane layer by contacting the flexible polyurethane layer with a laser beam generated by the laser system, wherein the contacting of the laser beam with the flexible polyurethane layer forms one or more voids in the flexible polyurethane layer, wherein in one of (i) and (ii) is true:
(i) wherein the decorative article intermediate comprises an adhesive layer adhered to the flexible polymeric polyurethane layer and wherein the adhesive layer is visible within the one or more voids; or
(ii) further comprising: contacting the flexible polymeric polyurethane layer having one or more voids with an adhesive layer, wherein the adhesive layer is visible within the one or more voids.

14. The method of claim 13, wherein the registering comprises one of a mechanical registration, optical registration, electro-mechanical registration, computerized registration, or combination thereof.

15. The method of claim 13, wherein the contacting of a laser beam with the flexible polyurethane layer removes at least some of the flexible polyurethane layer.

16. The method of claim 15, wherein the contacting of the laser bean with the flexible polyurethane layer comprises a sequential contacting of the laser beam with the flexible polyurethane layer.

17. The method of claim 16, wherein each sequential contacting of the laser beam with the flexible polyurethane layer removes at least some of the flexible polyurethane layer contained in the one or more voids.

18. The method of claim 17, wherein (i) is true and wherein the laser etching comprises sufficient laser beam energy and sufficient sequential passes of the laser beam to remove at least most, if not all, of the flexible polyurethane layer contained in the one or more voids but little, if any, of the adhesive layer material.

19. A decorative article, comprising:
an adhesive layer; and
a flexible metalized polyurethane layer, wherein the adhesive layer is adhered to the flexible metalized polyurethane layer having one or more voids, wherein the flexible metalized polyurethane layer is positioned on a decorative surface to be visible to a viewer, and wherein a portion of the adhesive within the one or more voids is visible to a viewer.

20. The decorative article of claim 19, the one or more voids have substantially smooth and level void walls.

21. The decorative article of claim 19, wherein the adhesive layer is not visible through the flexible metalized polyurethane layer.

22. The decorative article of claim 19, further comprising:
an optically transmissive layer positioned between the flexible metalized polyurethane layer and the adhesive layer, wherein the adhesive layer is adhered to the flexible metalized polyurethane layer, wherein the flexible metalized polyurethane layer has one or more voids, wherein the flexible metalized polyurethane is positioned on a decorative surface to be visible to a viewer, and wherein a portion of the adhesive layer within the one or more voids is visible to the viewer.

23. The decorative article of claim 22, wherein the optically transmissive layer comprises a thermoplastic resin film.

24. The decorative article of claim 23, further comprising:
a color enhancing layer positioned between the optically transmissive layer and the adhesive layer, and wherein the color-enhancing layer comprises a translucent color-containing layer.

* * * * *